(12) United States Patent
Enriquez et al.

(10) Patent No.: US 7,731,224 B2
(45) Date of Patent: Jun. 8, 2010

(54) INFLATABLE CURTAIN

(75) Inventors: Adan Beltran Enriquez, Washington, MI (US); Bruce R. Hill, Bloomfield Hills, MI (US)

(73) Assignee: TRW Vehicle Safety Systems Inc., Washington, MI (US)

(*) Notice: Subject to any disclaimer, the term of this patent is extended or adjusted under 35 U.S.C. 154(b) by 565 days.

(21) Appl. No.: 11/365,707

(22) Filed: Mar. 1, 2006

(65) Prior Publication Data
US 2007/0205589 A1    Sep. 6, 2007

(51) Int. Cl.
*B60R 21/16* (2006.01)
(52) U.S. Cl. .................................. 280/730.2
(58) Field of Classification Search .............. 280/730.2, 280/743.1, 728.2
See application file for complete search history.

(56) References Cited

U.S. PATENT DOCUMENTS

| | | | | |
|---|---|---|---|---|
| 5,899,486 A * | 5/1999 | Ibe | ........................ | 280/728.2 |
| 6,457,740 B1 * | 10/2002 | Vaidyaraman et al. | ... | 280/730.2 |
| 6,666,475 B2 * | 12/2003 | Kippschull | .............. | 280/730.2 |
| 6,883,827 B2 | 4/2005 | Keshavaraj | | |
| 6,889,999 B2 * | 5/2005 | Dominissini et al. | ..... | 280/730.2 |
| 7,125,037 B2 * | 10/2006 | Tallerico et al. | ......... | 280/728.2 |
| 7,144,038 B2 * | 12/2006 | Keshavaraj | ............. | 280/743.1 |
| 7,159,895 B2 * | 1/2007 | Aoki et al. | ............... | 280/730.2 |
| 7,159,896 B2 * | 1/2007 | Ochiai et al. | ............ | 280/730.2 |
| 7,163,231 B2 * | 1/2007 | Kumagai | ................. | 280/730.2 |
| 7,303,206 B2 * | 12/2007 | Kippschull et al. | ....... | 280/728.2 |
| 7,350,804 B2 * | 4/2008 | Bakhsh et al. | ........... | 280/730.2 |
| 2002/0020992 A1 * | 2/2002 | Kanuma | .................. | 280/730.2 |
| 2002/0105173 A1 * | 8/2002 | Saderholm et al. | ....... | 280/730.2 |
| 2005/0179238 A1 * | 8/2005 | Kippschull et al. | ....... | 280/728.2 |
| 2006/0119084 A1 * | 6/2006 | Coon et al. | .............. | 280/730.2 |
| 2006/0192368 A1 * | 8/2006 | Hall et al. | ................ | 280/730.2 |
| 2007/0063490 A1 * | 3/2007 | Minamikawa | ........... | 280/728.2 |
| 2007/0138777 A1 * | 6/2007 | Oh | .............................. | 280/740 |

FOREIGN PATENT DOCUMENTS

DE    19530346 A1 *   2/1996

* cited by examiner

*Primary Examiner*—Faye M. Fleming
(74) *Attorney, Agent, or Firm*—Tarolli, Sundheim, Covell & Tummino LLP

(57) ABSTRACT

Apparatus (10) for helping to protect an occupant (28) of a vehicle (12) that has a side structure (16) and a roof (18). The apparatus (10) includes an inflatable curtain (14) that is inflatable away from the vehicle roof (18) to a position between the side structure (16) of the vehicle (12) and the vehicle occupant (28). The inflatable curtain (14) includes a main portion (100) comprising at least one inflatable chamber (52). The inflatable curtain (14) also includes a mounting portion (102) constructed separately from the main portion (100). The mounting portion (102) has a lower edge portion (108) connectable to an upper edge portion (106) of the main portion (100). The mounting portion (102) when connected to the main portion (100) forms an upper edge portion of the inflatable curtain (14) that is connectable with the vehicle (12) to help secure the inflatable curtain in the vehicle.

20 Claims, 6 Drawing Sheets

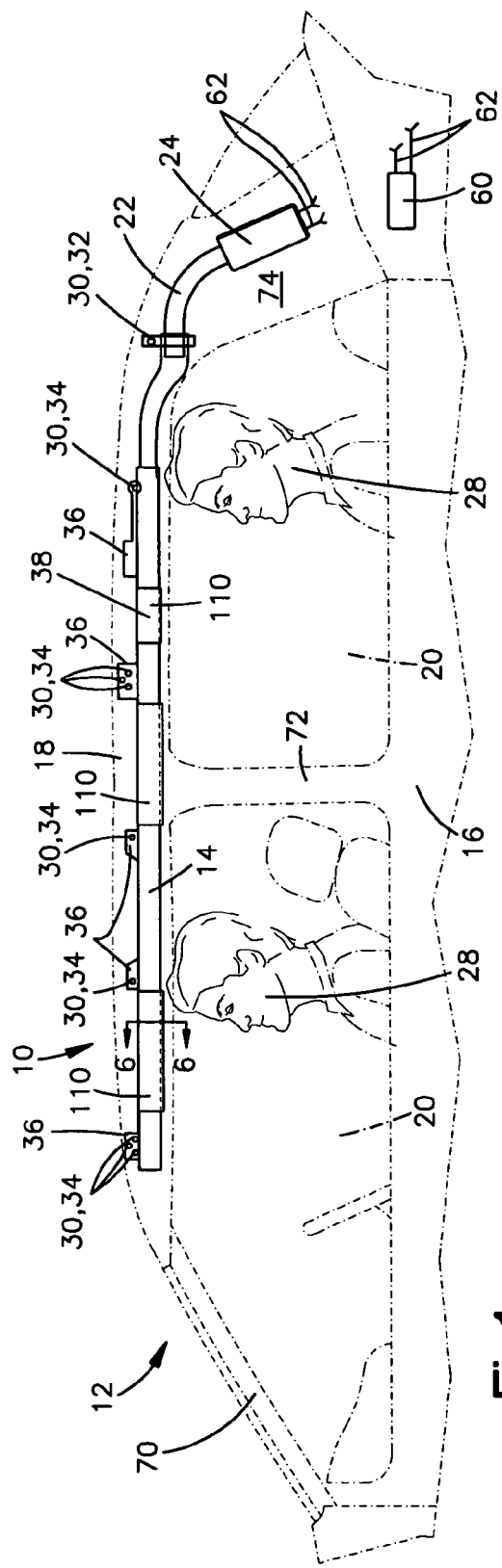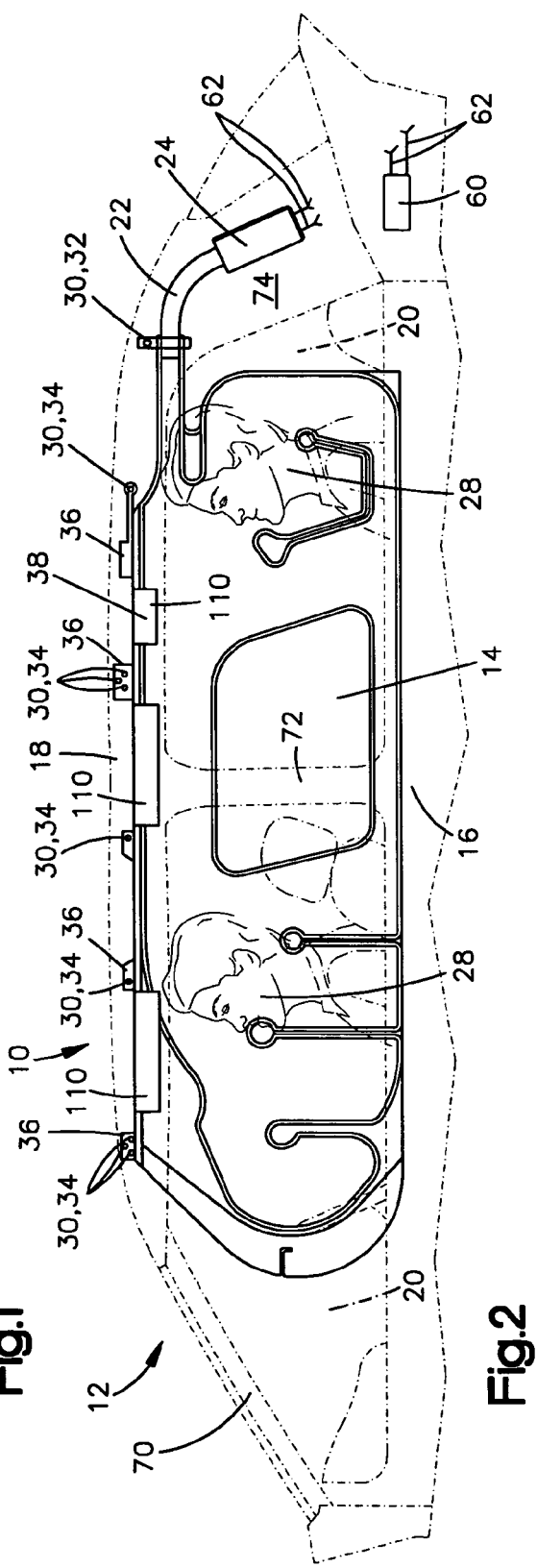

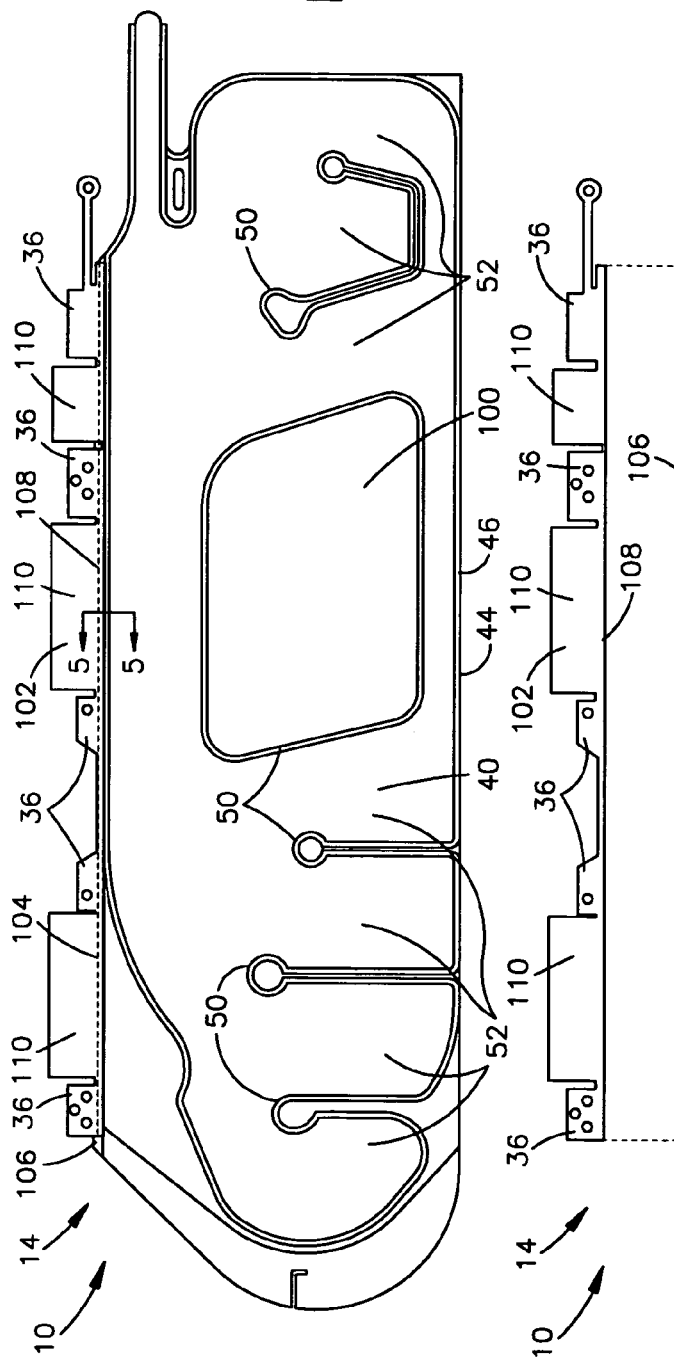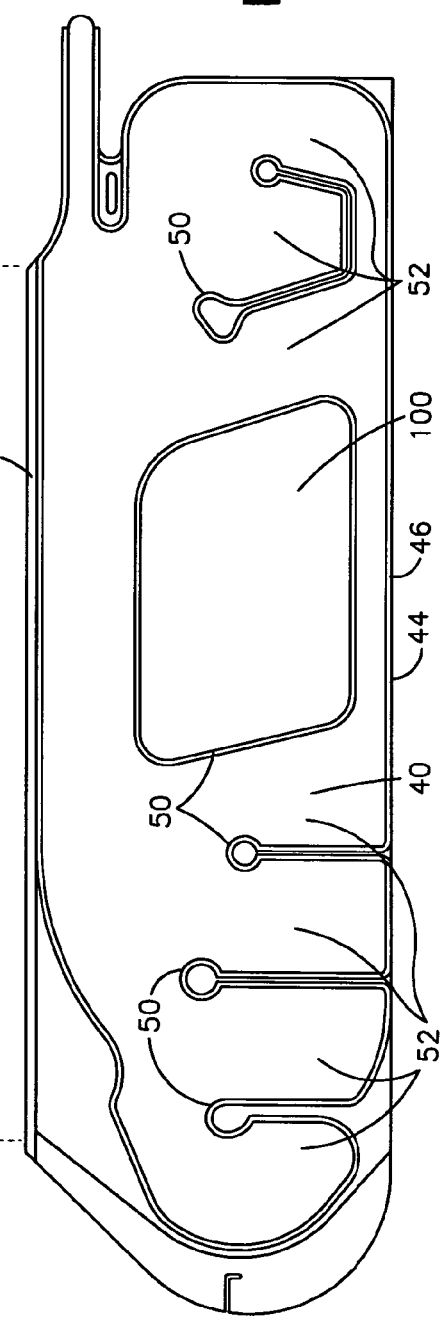

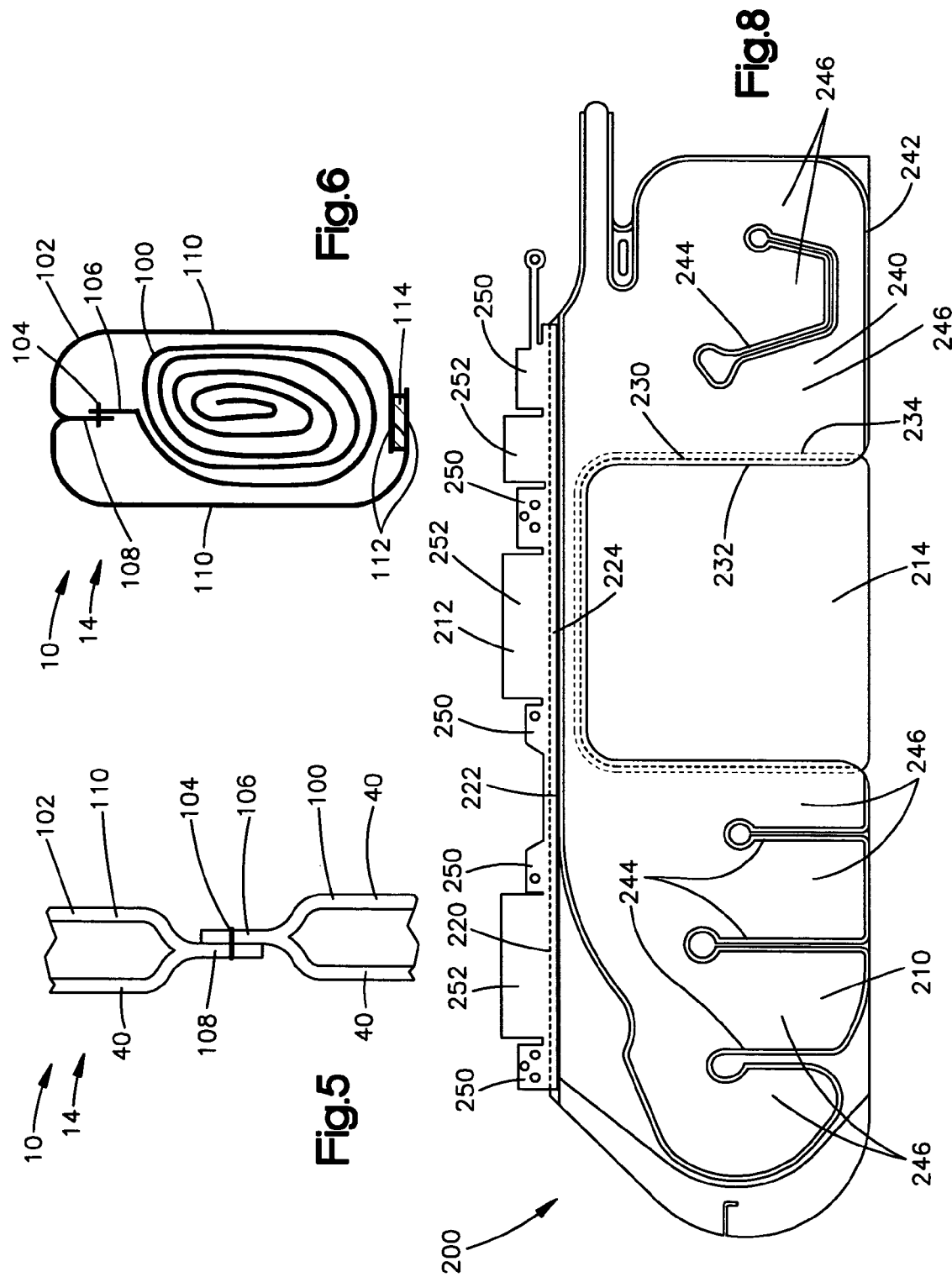

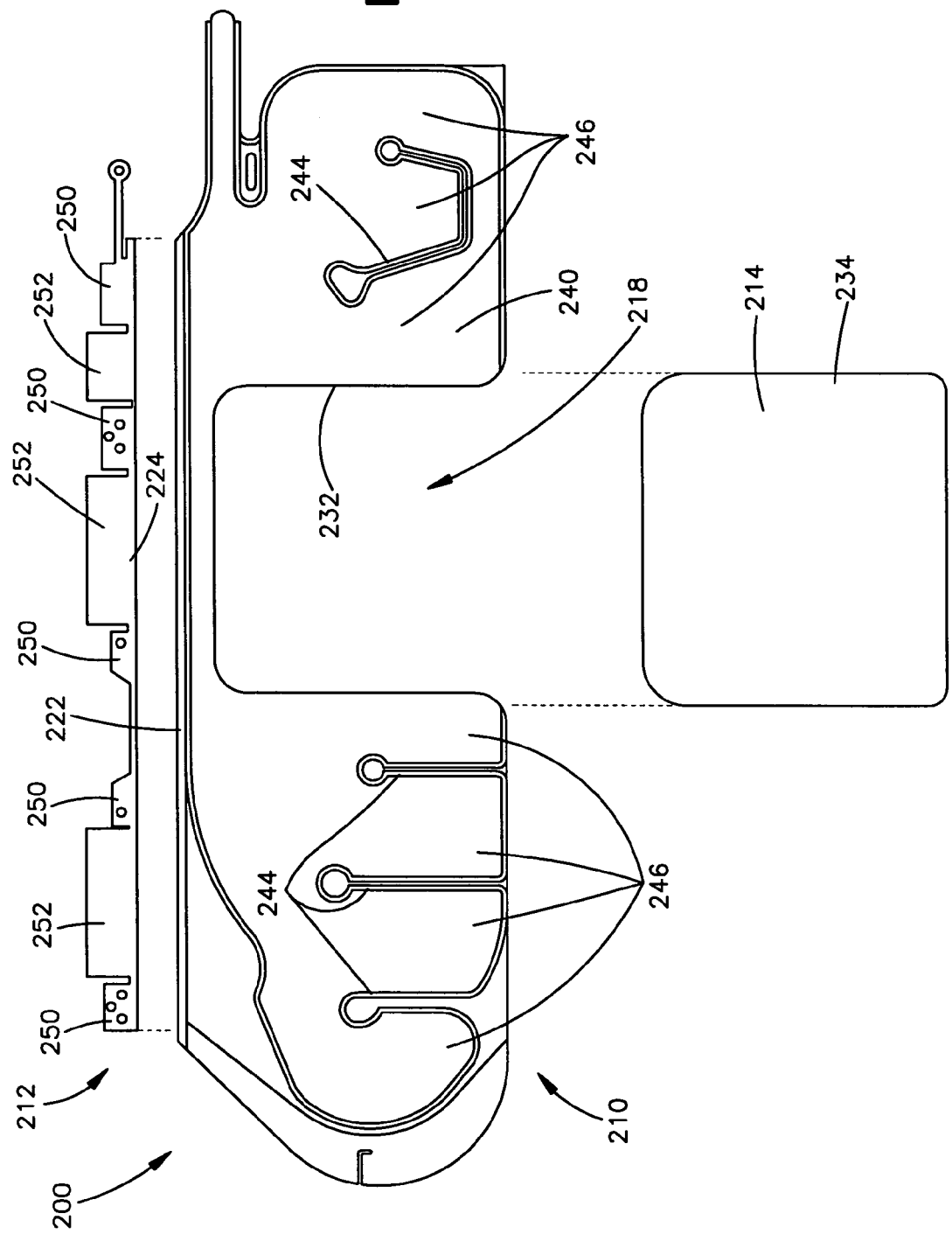

INFLATABLE CURTAIN

FIELD OF THE INVENTION

The present invention relates to an inflatable apparatus for helping to protect a vehicle occupant in the event of a side impact to the vehicle, a vehicle rollover, or both.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates away from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain.

SUMMARY OF THE INVENTION

The present invention relates to an apparatus for helping to protect an occupant of a vehicle that has a side structure and a roof. The apparatus includes an inflatable curtain that is inflatable away from the vehicle roof to a position between the side structure of the vehicle and a vehicle occupant. The inflatable curtain includes a main portion comprising at least one inflatable chamber. The inflatable curtain also includes a mounting portion constructed separately from the main portion. The mounting portion has a lower edge portion connectable to an upper edge portion of the main portion. The mounting portion when connected to the main portion forms an upper edge portion of the inflatable curtain that is connectable with the vehicle to help secure the inflatable curtain in the vehicle.

The present invention also relates to an apparatus for helping to protect an occupant of a vehicle that has a side structure and a roof. The apparatus includes an inflatable curtain that is inflatable away from the vehicle roof to a position between the side structure of the vehicle and a vehicle occupant. The inflatable curtain includes a main portion comprising at least one inflatable chamber. The inflatable curtain also includes a mounting portion for helping to secure the inflatable curtain to the vehicle. The mounting portion comprises at least one flap portion for extending around the main portion when the main portion is in a deflated and stored condition. The apparatus also includes a releasable connection that helps secure the at least one flap to maintain the main portion in the stored condition. The connection is releasable upon inflation of the inflatable curtain to allow the curtain to inflate and deploy.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect a vehicle occupant illustrating the apparatus in a pre-deployed condition in a vehicle, according to a first embodiment of the present invention;

FIG. 2 is a schematic view of the apparatus of FIG. 1 in a deployed condition in the vehicle;

FIG. 3 is a plan view of a portion of the apparatus of FIGS. 1 and 2 in a non-inflated condition;

FIG. 4 is an exploded view of the portion of the apparatus shown in FIG. 3;

FIG. 5 is a sectional view taken generally along line 5-5 in FIG. 3;

FIG. 6 is a sectional view taken generally along line 6-6 in FIG. 1;

FIG. 8 is a plan view of a portion of an apparatus for helping to protect a vehicle occupant, according to a second embodiment of the present invention;

FIG. 9 is an exploded view of the apparatus illustrated in FIG. 8; and

DESCRIPTION OF EMBODIMENTS

Figure 7:
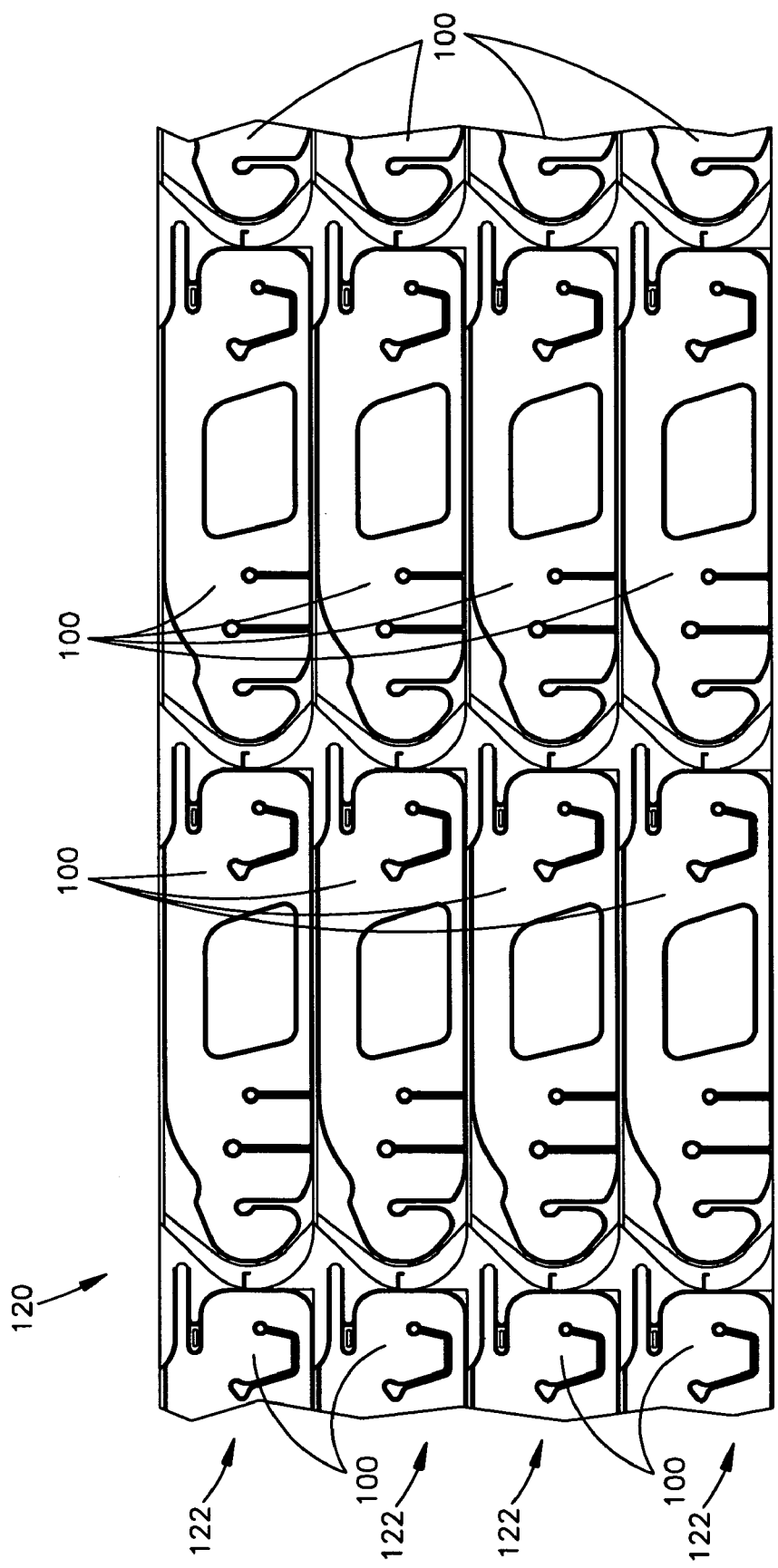
FIG. 7 is a schematic view illustrating the manufacture of a portion of the apparatus of FIG. 4.

Representative of the present invention, FIGS. 1 and 2 illustrate an apparatus 10 for helping to protect one or more occupants 28 of a vehicle 12. The apparatus 10 includes an inflatable vehicle occupant protection device in the form of an inflatable curtain 14. The inflatable curtain 14 has a stored condition, shown in FIG. 1, in which the non-inflated curtain is folded, rolled, or both folded and rolled, and positioned adjacent the intersection of a side structure 16 and a roof 18 of the vehicle 12. The inflatable curtain 14 is inflatable from the stored position in a direction away from the roof 18 to a deployed position, shown in FIG. 2. In the deployed position, the inflated curtain 14 extends along the side structure 16 and is positioned between the side structure and any occupants 28 of the vehicle 12.

The inflatable curtain 14 can be constructed of any suitable material, such as woven fabrics, as described below in further detail. The inflatable curtain 14 may be uncoated, coated with a material, such as a gas impermeable urethane, or laminated with a material, such as a gas impermeable film. The inflatable curtain 14 thus may have a gas-tight or substantially gas-tight construction. Those skilled in the art will appreciate that alternative materials, such as silicone, may also be used to coat or laminate the inflatable curtain 14.

The apparatus 10 also includes an inflation fluid source in the form of an inflator 24. The inflator 24 is actuatable to provide inflation fluid for inflating the inflatable curtain 14. The inflator 24 may be of any suitable construction or configuration. For example, the inflator 24 may contain a stored quantity of pressurized inflation fluid (not shown) in the form of a gas for inflating the inflatable curtain 14. As another example, the inflator 24 could contain a combination of pressurized inflation fluid and ignitable material for heating the inflation fluid, or could be a pyrotechnic inflator that uses the combustion of gas-generating material to generate inflation fluid. As a further example, the inflator 24 could be of any suitable type or construction for supplying a medium for providing inflation fluid for inflating the inflatable curtain 14.

In the embodiment illustrated in FIG. 1, the inflator 24 is connected in fluid communication with the inflatable curtain 14 through a conduit or fill tube 22'. The fill tube 22 may be constructed of any suitable material, such as metal, plastic, or fabric. Alternatively, the fill tube 22 may be omitted and inflation fluid could be discharged into the inflatable curtain 14 from the inflator 24 directly or through a manifold.

The fill tube 22 may also have any suitable configuration. For example, as shown in FIGS. 1 and 2, the fill tube 22 may extend into a rear portion of the inflatable curtain 14 and terminate in the rear portion. Alternatively, the fill tube 22 may extend substantially along the entire length of the inflatable curtain 14. As another alternative, the fill tube 22 may extend along any portion of the length of the inflatable curtain 14. The portion of the fill tube 22 positioned in the inflatable curtain 14 includes one or more openings (not shown) through which inflation fluid is delivered to the curtain.

In the stored condition, the apparatus 10 is supported in the vehicle 12 by means 30, such as hooks, brackets, or fasteners, that connect the inflatable curtain 14, inflator 24, fill tube 22, or any combination thereof, to the vehicle. For example, as shown in FIGS. 1 and 2, the means 30 includes a clamp or bracket 32 that encircles and clamps onto the fill tube 22 and the inflatable curtain 14 to help secure the curtain and fill tube to the vehicle 12. The means 30 also includes fasteners 34 that extend through tabs 36 spaced along an upper edge portion 38 of the inflatable curtain 14 to help secure the curtain to the vehicle 12.

Referring to FIGS. 2-6, according to the present invention, the inflatable curtain 14 includes a main portion 100 and a mounting portion 102. Referring to FIGS. 3, 5, and 6, the main portion 100 and mounting portion 102 are secured to each other at a connection 104 that connects an upper edge portion 106 of the main portion to a lower edge portion 108 of the mounting portion. The connection 104 may be formed in any suitable manner, such as by stitching the edge portions 106 and 108 together or bonding the edge portions via ultrasonic welding, heat bonding, or adhesive bonding.

The main portion 100 has a one piece woven construction in which portions are woven to form two layers of material that define overlying panels 40 (see FIG. 5) of the main portion. Referring to FIGS. 2-5, other portions of the main panel 100 are woven to form single layer portions that define connections of the main portion 100. For example, single layer portions of the main portion 100 may be woven along at least a portion of a perimeter 44 of the main portion 100 to form a perimeter connection 46 of the main portion. The perimeter connection 46 helps define an inflatable volume of the inflatable curtain 14.

The main portion 100 may also include portions woven as a single layer to define interior connections 50 within the perimeter 44 of the curtain. The interior connections 50 define non-inflatable portions of the inflatable curtain 14 within the perimeter 44 of the main portion 100. The perimeter connection 46, interior connections 50, and panels 40 help define inflatable chambers 52 of the inflatable curtain 14. The configuration of the interior connection 50, and thus the chambers 52, may vary depending on a variety of factors, such as the architecture of the vehicle 12, the position of the inflatable curtain 14 in the vehicle, and the desired extent or coverage of the curtain.

Referring to FIGS. 3 and 6, the mounting portion 102 includes the tabs 36 that cooperate with the means 30 to help secure the inflatable curtain 14 to the vehicle 12. The mounting portion 102 also includes cover flaps 110 that help support the inflatable curtain in the stored condition of FIG. 1. In the embodiment shown in FIGS. 3 and 6, the cover flaps 110 are arranged in overlying pairs spaced along the length of the mounting portion 102. This may be done, for example, by securing a separate cover flap piece to the mounting portion 102. Alternatively, in a one piece woven construction of the mounting portion 102, the overlying cover flaps 110 would be woven in a dual layer construction. As another alternative, the entire inflatable curtain 14, including the main portion 100 and mounting portion 102, could have a one piece woven construction in which the cover flaps 110 are formed as integral portions of the curtain.

Referring to FIGS. 1 and 6, the cover flaps 110 extend or are wrapped around the folded/rolled curtain to help maintain the inflatable curtain 14 in the stored condition. Overlapping terminal end portions 112 of the cover flaps 110 are secured to each other via means 114, such as double-sided tape, an adhesive, tear stitching, or other rupturable connections. The cover flaps 110 thus form a loop of material that extends around the inflatable curtain 14 and supports the curtain while in the stored condition. As shown in FIG. 1, the spacing of the cover flaps 110 along the length of the inflatable curtain helps distribute support for the curtain along its length when in the stored condition.

Upon sensing the occurrence of an event for which inflation of the inflatable curtain 14 is desired, such as a side impact, a vehicle rollover, or both, a sensor 60 (FIGS. 1 and 2) provides an actuation signal to the inflator 24 via lead wires 62. Upon actuation of the inflator 24, inflation fluid is directed through the fill tube 22 into the inflatable curtain 14. The inflatable curtain 14 inflates and deploys under the pressure of inflation fluid provided by the inflator 24 from the stored position of FIG. 1 to the deployed position of FIG. 2.

In the deployed position, the inflatable curtain 14 is positioned between the side structure 16 and any occupants 28 of the vehicle 12. The inflatable curtain 14, when inflated, extends fore and aft in the vehicle 12 along the side structure 16 and may cover or at least partially cover the side windows 20. The inflatable curtain 14 may also cover portions of an A pillar 70, B pillar 72 and C pillar 74 of the vehicle 12. The inflatable curtain 14 helps absorb impacts with the curtain and helps distribute the energy of impacts throughout a large area of the curtain.

When the inflation fluid is directed through the fill tube 22 into the inflatable curtain 14, the means 114 separates or otherwise ruptures, thus releasing the cover flaps 110 and allowing the curtain to deploy in the manner described above. Advantageously, incorporating the cover flaps 110 in the construction of the inflatable curtain 14 helps eliminate the need for separate means, such as covers, sheaths, tethers, and housings, for helping support the curtain in the stored condition. This may help reduce the amount of materials, and the associated costs, required to produce the apparatus 10. This may also simplify the assembly and installation of the apparatus 10 by reducing parts and manufacturing steps.

According to the present invention, the configuration of the inflatable curtain 14 in which the main portion 100 and mounting portion 102 are constructed as separate components facilitates a materially efficient production of the curtain. By "materially efficient production," it is meant that the two-piece configuration helps reduce the amount of waste or scrap material produced during manufacture of the inflatable curtain 14. According to the present invention, this materially efficient construction allows the main portion 100 to be woven on a loom in a continuous weaving process in which several main portions are woven simultaneously in a roll and then cut out. FIG. 7 illustrates an example of multiple main portions 100 woven in a roll 120.

As shown in FIG. 7, the main portions 100 are arranged in rows 122 extending along a length of the roll 120. In the embodiment of FIG. 7, there are four such rows 122. In each row 122, the main portions 100 are positioned in a relatively close, end-to-end arrangement. Additionally, because the upper and lower edges of the main portion 100 are substantially straight, the rows 122 themselves can be positioned close to each other, with upper edges of the main portions 100 of one row being positioned close to the lower edges of the main portions of the next row. As can be seen in FIG. 7, there is relatively little waste material in the roll 120. This helps reduce material costs associated with manufacturing the inflatable curtain 14. Those skilled in the art will appreciate that the mounting portion 102, having an irregular upper edge, does not allow for closely positioned rows. Thus, if the main portion 100 and mounting portion 102 are woven together as a single piece, a significant increase in scrap material may result.

Constructing the mounting portion 102 separate from the main portion 100 also allows for manufacturing these portions from different materials. The main portion 100 comprises the inflatable portions of the inflatable curtain 14 and is the primary impact force absorbing component of the curtain. The material used to construct the main portion 100 thus may be selected to exhibit properties such as strength, durability, puncture/tear resistance, heat resistance, and gas impermeability. An example of a material that may be used to construct the main portion 100 is a nylon material, such as a nylon 6-6 material.

The mounting portion 102 is a non-inflatable portion of the inflatable curtain 14 with the primary purpose of helping facilitate securing the curtain in the vehicle 12. The strength, durability, puncture/tear resistance, heat resistance, and gas impermeability required from the material used to construct the mounting portion 102 thus may be different than that required from the material used to construct the main portion 100. An example of a material that may be used to construct the mounting portion 102 is a polyester fabric, such as a polyethylene terephthalate (PET) fabric. The use of such a material may offer significant cost savings over those used to construct the main portion 100.

The main and mounting portions 100 and 102, being constructed separately, also may be produced using different manufacturing methods or techniques. For example, the main portion 100 may have a one piece woven construction in which the overlying panels 40 are woven simultaneously. In this construction of the main portion 100, inflatable portions (e.g., the chambers 52) are formed by weaving separate layers of material and non-inflatable portions (e.g., the connections 44 and 50) are formed by weaving a single layer of material. This one piece woven construction of the main portion 100 is relatively complex because of the curved configurations of the connections 44 and 50 and the chambers 52. Therefore, relatively complex manufacturing equipment, such as a Jacquard loom, may be required to produce the main portion 100.

In comparison, the mounting portion 102, being non-inflatable, may be constructed of a single layer woven material. The mounting portion thus may not require special weaving considerations and may avoid the need to use more expensive equipment, such as a Jacquard loom. The mounting portion 102 may, for example, be cut from a roll of plain woven material.

The separate construction of the main portion 100 and mounting portion 102 also may allow for a more efficient use of the equipment (e.g., looms) used to manufacture the portions. For example, referring to FIG. 7, depending on the dimensions of a particular inflatable curtain 14 design, manufacturing the mounting portion 102 separately may allow for weaving an extra row 122 of main portions 100 in the sheet 120. This would allow for an increase in the production rate (e.g., curtains per hour) of the loom.

Weaving the main portion 100 separate from the mounting portion 102 also may produce a decrease in the amount of material used to construct the inflatable curtain 14. For example, in the illustrated embodiment, the inflatable curtain 14 may have overall nominal dimensions of about 590 millimeters height and 1850 millimeters length. By "nominal overall dimensions," it is meant that a 590×1850 millimeter rectangle is the smallest rectangle into which the inflatable curtain 14 would fit. By producing the mounting portion 102 separate from the main portion 100, the nominal height of the one piece woven main portion can be reduced from 590 millimeters to about 520 millimeters. For the 1850 millimeter curtain length, the amount of one piece woven material per curtain (including scrap) may be reduced from about 2.22 m$^2$ to about 1.95 m$^2$, which amounts to about a 13% reduction in one piece woven material.

The mounting panel 102 of the example set forth above requires about 0.15 m$^2$ of material. Because, as described above, the mounting portion 102 may have different physical property requirements than the main portion 100, the mounting portion may be constructed of a less costly material. Thus, for example, the one piece woven main portion 100 may be woven with 470 dtex nylon 6-6 yarns woven in a 3×3 basket weave at about 40×40 ends/cm using a relatively complex Jacquard weaving method. In comparison, the mounting portion 102 may be constructed of a plain woven fabric with 1670 dtex polyethylene terephthalate (PET) yarns at about 13×13 ends/cm. In this example, in material costs alone, the savings realized by eliminating the mounting portion 102 from inclusion in the one piece woven nylon portion of the inflatable curtain 14 and instead using plain woven PET material may be about 40%.

Figure 10:
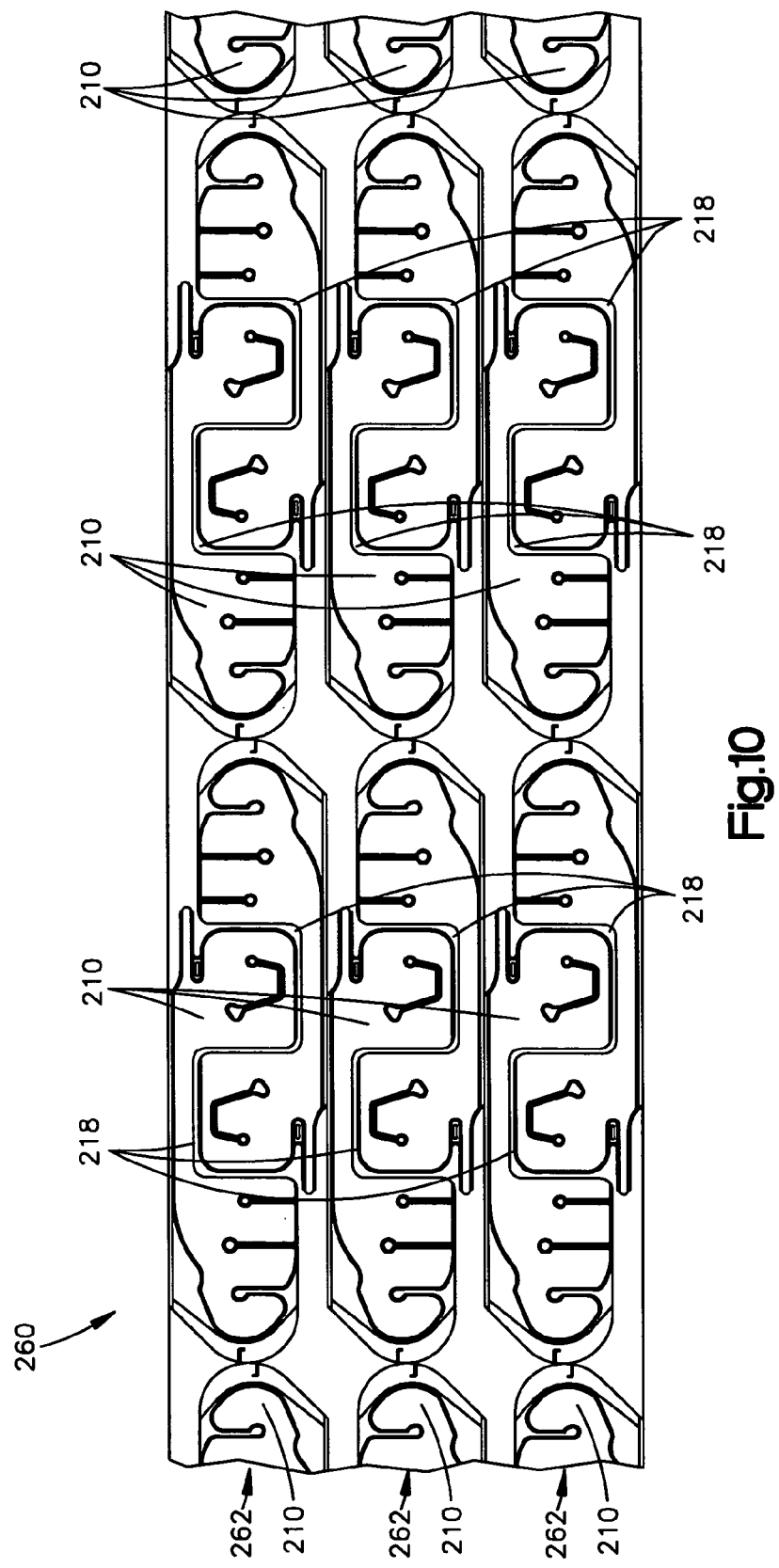
FIG. 10 is a schematic view illustrating the manufacture of a portion of the apparatus of FIGS. 8 and 9.

A second embodiment of the present invention is illustrated in FIGS. 8-10. The second embodiment of the present invention is similar to the first embodiment of the invention illustrated in FIGS. 1-7.

Referring to FIGS. 8-10, according to the present invention, an inflatable curtain 200 includes a main portion 210, a mounting portion 212, and a center panel 214. Referring to FIG. 8, the main portion 210 and mounting portion 212 are secured to each other at a connection 220 that connects an upper edge portion 222 of the main portion to a lower edge portion 224 of the mounting portion 212. The center panel 214 is positioned in a central open space 218 of the main portion 210 and secured to the main portion at a connection 230 that extends along mating edge portions 232 and 234 of the main portion and center panel, respectively. The center panel 214 thus forms a generally central portion of the inflatable curtain. The connections 220 and 230 may be formed in any suitable manner, such as by stitching, ultrasonic welding, heat bonding, or adhesive bonding.

The main portion 210 has a one piece woven construction in which portions are woven in two layers to define overlying panels 240. Portions of the main portion 210 are woven to form non-inflatable single layers, including a perimeter connection 242 and interior connection 244. The perimeter connection 242, interior connection 244, and panels 240 help define inflatable chambers 246 of the inflatable curtain 200.

The mounting portion 212 includes tabs 250 that cooperate with means (not shown), such as brackets, hooks, or fasteners, to help secure the inflatable curtain 200 to the vehicle. The mounting portion 212 also includes cover flaps 252 that help support the inflatable curtain in the stored condition in a manner similar or identical to that described above in connection with the first embodiment of FIGS. 1-7.

According to the present invention, the configuration of the inflatable curtain 200 in which the main portion 210, mounting portion 212, and center panel 214 are constructed as separate components facilitates a materially efficient production of the curtain. This materially efficient construction allows the main portion 210 to be woven on a loom in a continuous weaving process in which several main portions are woven simultaneously in a roll and then cut out. FIG. 10 illustrates an example of multiple main portions 210 woven in a roll 260.

As shown in FIG. 10, the main portions 210 are arranged in rows 262 extending along a length of the roll 260. In the embodiment of FIG. 10, there are three such rows 262. Advantageously, because the main panel 210 includes the space 218 for receiving the center panel 214, the main portions can be nested in each row 262 in an alternately inverted manner. In each row 262, the nested pairs of main portions 210 are positioned in a relatively close, end-to-end arrangement. Additionally, the rows 262 themselves are positioned close to each other. As can be seen in FIG. 10, there is relatively little waste material in the roll 260. This helps reduce material costs associated with manufacturing the inflatable curtain 200.

Constructing the mounting portion 212 and center panel 214 separate from the main portion 210 also allows for manufacturing these portions from different materials. The main portion 210 comprises the inflatable portions of the inflatable curtain 200 and is the primary impact force absorbing component of the curtain. The material used to construct the main portion 210 thus may be selected to exhibit properties such as strength, durability, puncture/tear resistance, heat resistance, and gas impermeability. An example of a material that may be used to construct the main portion 210 is a nylon material, such as a nylon 6-6 material.

The mounting portion 212 is a non-inflatable portion of the inflatable curtain 200 with the primary purpose of helping facilitate securing the curtain in the vehicle. The strength, durability, puncture/tear resistance, heat resistance, and gas impermeability required from the material used to construct the mounting portion 212 thus may be different than that required from the material used to construct the main portion 210. An example of a material that may be used to construct the mounting portion 212 is a polyester fabric, such as a polyethylene terephthalate (PET) fabric. The use of such a material may offer significant cost savings over those used to construct the main portion 210.

The center panel 214 is also a non-inflatable portion of the inflatable curtain 200 configured to extend along a portion of the vehicle, such as adjacent or near a B-pillar. The physical properties of the material used to construct the center panel (e.g., strength, durability, puncture/tear resistance, heat resistance, and gas impermeability) may be similar or identical to those of the mounting portion 212. These properties could, however, differ from those required of the mounting portion 212 because the center panel 214 may be configured to carry relatively little load during use of the inflatable curtain 200. An example of a material that may be used to construct the center panel 214 is a light weight polyester fabric. The use of such a material may offer additional cost savings over those used to construct the main portion 210 and mounting portion 212. The use of such a material may also help facilitate improved rolling, folding, or otherwise packaging the inflatable curtain.

The mounting portion 212 and center panel 214, being constructed separate from the main panel 210, also may be produced using different manufacturing methods or techniques. For example, the main portion 210 may have a one piece woven construction in which the overlying panels 240 are woven simultaneously. In this construction of the main portion 210, inflatable portions (e.g., the chambers 246) are formed by weaving separate layers of material and non-inflatable portions (e.g., the connections 242 and 244) are formed by weaving a single layer of material. This one piece woven construction of the main portion 210 is relatively complex because of the curved configurations of the connections 242 and 244 and the chambers 246. Therefore, relatively complex manufacturing equipment, such as a Jacquard loom, may be required to produce the main portion 210.

In comparison, the mounting portion 212 and center panel 214, being non-inflatable, may be constructed of single layer woven materials. However, as described above, two layers of material may be required to form flap 252. The mounting portion 212 and center panel 214 thus may not require special weaving considerations and may avoid the need to use more expensive equipment, such as a Jacquard loom. The mounting portion 212 and center panel 214 may, for example, be cut from rolls of plain woven material.

The mounting portion 212 and center panel 214, being constructed separate from the main panel 210, also may allow for a more efficient use of the equipment (e.g., looms) used to manufacture the portions. For example, referring to FIG. 10, depending on the dimensions of a particular inflatable curtain 200 design, manufacturing the mounting portion 212 and center panel 214 separately may allow for weaving an extra row 262 of main portions 210 in the roll 260. This would allow for an increase in the production rate (e.g., curtains per hour) of the loom.

Constructing the mounting portion 212, center panel 214, and main panel 210 as separate components also may produce a decrease in the amount of material used to construct the inflatable curtain 200. For example, the main portion 210 may be woven with 470 dtex nylon 6-6 yarns woven in a 3×3 basket weave at about 40×40 ends/cm using a relatively complex Jacquard weaving method. The mounting portion 212 may be constructed of a plain woven fabric with 1670 dtex polyethylene terephthalate (PET) yarns at about 13×13 ends/cm. The center panel 214 may be constructed of a plain woven fabric with 500 dtex polyester yarns at about 18×18 ends/cm.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, the apparatus comprising:
    an inflatable curtain that is inflatable away from the vehicle roof to a position between the side structure of the vehicle and a vehicle occupant, the inflatable curtain comprising:
    a main portion comprising at least one inflatable chamber; and
    at least one mounting portion constructed separately from the main portion, the main portion and mounting portion being secured to each other at a connection that connects a lower edge portion of the mounting portion to an upper edge portion of the main portion, the at least one mounting portion when so connected to the main portion defining the upper edge of the inflatable curtain, the mounting portion comprising at least one tab portion connectable with the vehicle to help secure the inflatable curtain in the vehicle, the mounting portion also comprising at least one flap portion extendable around the main portion to help maintain the inflatable curtain in a stored condition.

2. The apparatus recited in claim 1, wherein the main portion has a one piece woven construction comprising single layer and two layer portions that define inflatable chambers of the inflatable curtain.

3. The apparatus recited in claim 2, wherein the mounting portion is constructed as a single layer of material.

4. The apparatus recited in claim 1, wherein the main portion is constructed of a first woven material and the mounting portion is constructed of a second woven material different than the first woven material.

5. The apparatus recited in claim 4, wherein the first woven material is a woven nylon material and the second woven material is a woven polyester material.

6. The apparatus recited in claim 5, wherein the nylon material comprises a nylon 6-6 material and the polyester material comprises a polyethylene terephthalate material.

7. The apparatus recited in claim 6, wherein the nylon 6-6 material comprises 470 dtex nylon 6-6 yarns woven at about 40×40 ends/cm.

8. The apparatus recited in claim 7, wherein the nylon 6-6 material has a basket weave construction.

9. The apparatus recited in claim 6, wherein the polyethylene terephthalate material comprises 1670 dtex polyethylene terephthalate (PET) yarns woven at about 13×13 ends/cm.

10. The apparatus recited in claim 1, wherein the main portion is constructed of a coated woven material and the mounting portion is constructed of an uncoated woven material.

11. Apparatus for helping to protect an occupant of a vehicle that has a side structure and a roof, the apparatus comprising:
an inflatable curtain that is inflatable away from the vehicle roof to a position between the side structure of the vehicle and a vehicle occupant, the inflatable curtain comprising:
a main portion comprising at least one inflatable chamber; and
at least one mounting portion constructed separately from the main portion and having a lower edge portion connected to an upper edge portion of the main portion, the at least one mounting portion forming an upper edge portion of the inflatable curtain connectable with the vehicle to help secure the inflatable curtain in the vehicle, the apparatus further comprising a center panel constructed as a piece of material separate from the main portion and mounting portion, the center panel being connectable with the main portion to form a central portion of the inflatable curtain.

12. The apparatus recited in claim 11, wherein the center panel is constructed of a single layer plain woven material.

13. The apparatus recited in claim 11, wherein the center panel is constructed of a third woven material different than the first and second woven materials.

14. The apparatus recited in claim 13, wherein the third woven material comprises a single layer plain woven polyester material.

15. The apparatus recited in claim 14, wherein the polyester material comprises 500 dtex polyester yarns woven at about 18×18 ends/cm.

16. The apparatus recited in claim 1, wherein the mounting portion comprises at least one flap portion for extending around the main portion when the main portion is in a deflated and stored condition, the apparatus further comprising a releasable connection that helps secure the at least one flap to maintain the main portion in the stored condition, the connection being releasable upon inflation of the inflatable curtain to release the at least one flap to allow the curtain to inflate and deploy.

17. Apparatus for helping to protect an occupant of a vehicle that has a side structure and a roof, the apparatus comprising:
an inflatable curtain that is inflatable away from the vehicle roof to a position between the side structure of the vehicle and a vehicle occupant, the inflatable curtain comprising:
a main portion comprising at least one inflatable chamber; and
at least one mounting portion constructed separately from the main portion and having a lower edge portion connected to an upper edge portion of the main portion, the at least one mounting portion forming an upper edge portion of the inflatable curtain connectable with the vehicle to help secure the inflatable curtain in the vehicle, the apparatus, wherein the mounting portion comprises at least one flap portion for extending around the main portion when the main portion is in a deflated and stored condition, the apparatus further comprising a releasable connection that helps secure the at least one flap to maintain the main portion in the stored condition, the connection being releasable upon inflation of the inflatable curtain to release the at least one flap to allow the curtain to inflate and deploy, wherein the releasable connection comprises double sided tape.

18. Apparatus for helping to protect an occupant of a vehicle that has a side structure and a roof, the apparatus comprising:
an inflatable curtain that is inflatable away from the vehicle roof to a position between the side structure of the vehicle and a vehicle occupant, the inflatable curtain comprising:
a main portion comprising at least one inflatable chamber; and
at least one mounting portion constructed separately from the main portion and having a lower edge portion connected to an upper edge portion of the main portion, the at least one mounting portion forming an upper edge portion of the inflatable curtain connectable with the vehicle to help secure the inflatable curtain in the vehicle, the apparatus, wherein the mounting portion comprises at least one flap portion for extending around the main portion when the main portion is in a deflated and stored condition, the apparatus further comprising a releasable connection that helps secure the at least one flap to maintain the main portion in the stored condition, the connection being releasable upon inflation of the inflatable curtain to release the at least one flap to allow the curtain to inflate and deploy, wherein the mounting portion has a one piece woven construction in which the at least one flap comprises a two layer portion defining overlying flaps, the flaps being extendable around opposite sides of the main portion when in the stored condition, the flaps having end portions connectable to each other via the releasable connection.

19. Apparatus for helping to protect an occupant of a vehicle that has a side structure and a roof, the apparatus comprising:
an inflatable curtain that is inflatable away from the vehicle roof to a position between the side structure of the vehicle and a vehicle occupant, the inflatable curtain comprising:
a main portion comprising at least one inflatable chamber; and
a separately constructed mounting portion connected with the main portion to help secure the inflatable curtain to the vehicle, the mounting portion comprising at least one flap portion for extending around the main portion when the main portion is in a deflated and stored condition, the apparatus further comprising a releasable connection that helps secure the at least one flap to maintain the main portion in the stored condition, the connection being releasable upon inflation of the inflatable curtain to allow the curtain to inflate and deploy, wherein the mounting portion has a one piece woven construction in which the at least one flap comprises a two layer portion defining overlying flaps, the flaps being extendable around opposite sides of the main portion when in the stored condition, the flaps having end portions connectable to each other via the releasable connection.

20. The apparatus recited in claim 1, wherein the mounting portion extends substantially along the entire length of the upper edge portion of the main portion.

\* \* \* \* \*